United States Patent [19]
Styring

[11] 4,083,924
[45] Apr. 11, 1978

[54] METHOD OF REGENERATING USED CONTAMINANT-REMOVING MATERIAL

[75] Inventor: Ralph E. Styring, Dallas, Tex.

[73] Assignee: Atlantic Richfield Company, Los Angeles, Calif.

[21] Appl. No.: 435,760

[22] Filed: Jan. 23, 1974

[51] Int. Cl.² ............... C01B 27/00; C01B 29/00; C01G 29/00; C22B 30/00
[52] U.S. Cl. ............... 423/88; 208/253; 208/295; 423/509; 423/561 R
[58] Field of Search ........... 423/561, 87, 88, 509; 208/253, 295, 52 CT

[56] References Cited

U.S. PATENT DOCUMENTS

| | | | |
|---|---|---|---|
| 3,069,350 | 12/1962 | Ramella | 208/253 |
| 3,380,819 | 4/1968 | Cavanagh | 423/88 |
| 3,519,492 | 7/1970 | Huml et al. | 423/509 |
| 3,645,912 | 2/1972 | Gatsis | 208/253 |

*Primary Examiner*—O. R. Vertiz
*Assistant Examiner*—Eugene T. Wheelock
*Attorney, Agent, or Firm*—Roderick W. MacDonald; James C. Fails; M. David Folzenlogen

[57] ABSTRACT

A method of regenerating used particulate contaminant-removing material, such as iron oxide or iron sulfide, that has been used to remove a contaminant, such as arsenic, from a synthetic hydrocarbonaceous feed and effect deposition of the contaminant within the material, characterized by a multi-step process as follows: (1) the used, or spent, contaminant-removing material is intimately contacted with a sulfur-containing material, such as hydrogen sulfide or sulfur, in an inert atmosphere of non-oxidizing fluid and at elevated temperature; (2) the contaminant deposited in the contaminant-removing material is reacted with the sulfur in the sulfur-containing material at the elevated temperature and the resulting sulfides of the contaminant; for example, arsenic sulfides; are converted to gaseous form to separate them from the regenerated contaminant-removing material; and (3) the sulfides of the contaminant are condensed and oxidized to form the oxides of the contaminant; for example, arsenic oxides. The oxides are, ordinarily, commercially desirable products that can be sold. Also disclosed are respective embodiments and the specific reaction conditions for carrying out the invention.

10 Claims, No Drawings

METHOD OF REGENERATING USED CONTAMINANT-REMOVING MATERIAL

BACKGROUND OF THE INVENTION

1. Field of the Invention

This invention relates to a method of removing a contaminant from contaminated material. More specifically, it relates to a method of removing a contaminant, such as arsenic, from spent contaminant-removing material that has been used to remove the arsenic from a synthetic crude or the like.

2. Description of the Prior Art

Only recently, it has been discovered by co-workers Gary Myers and Donald Wunderlich that solid particulate material can be employed to remove a contaminant, such as selenium or arsenic, from a fluid in order to avoid poisoning downstream catalyst employed in further treating the fluid; for example, to prevent poisoning of an expensive hydrogenation catalyst. The particulate material and method are defined in patent application Ser. No. 314,015, filed Dec. 11, 1972, now abandoned in favor of Ser. No. 421,139, filed Dec. 3, 1973 by inventors Gary A. Myers and Donald K. Wunderlich, entitled "Synthetic Oil Treatment" and assigned to the assignee of this application. The descriptive matter of that patent application is incorporated herein by reference for the details needed for full and complete understanding of this invention.

Specifically, patent application Ser. No. 314,015 recited at page 2 et seq: "It has now been discovered that at least one of antimony, arsenic, selenium, and phosphorus can be removed from a hydrocarbonaceous liquid which is not naturally occurring, (i.e., is not a naturally occurring crude oil or a fraction derived therefrom) but which is obtained from normally solid coal, oil shale, or tar sands. Th hydrocarbonaceous liquid of this invention can, therefore, be a synthetic crude oil or a fraction derived therefrom. The non-naturally occurring hydrocarbonaceous liquid is contacted with a material selected from the group consisting of iron, cobalt, nickel, oxides of one or more of those metals, sulfides of one or more of those metals, and combinations of two or more of said metals, oxides, and/or sulfides. The sulfide form is presently preferred.

"The above materials are employed on the synthetic oil (this includes synthetic crude oil or a fraction thereof) under a reducing atmosphere and at an elevated temperature of at least 300° F., there being substantially no water present. In this manner, the impurities are taken up by the material itself in a substantially water insoluble form.

"In th discussion of this invention, reference to antimony, arsenic, selenium and phosphorus impurities is intended to include those impurities in the free or elemental form as well as those impurities in any combined form.

"According to the method of this invention antimony, arsenic, selenium, phosphorus, and combinations of two or more thereof, whether in elemental or combined form, are removed from hydrocarbonaceous liquids that have been obtained by liquefying normally solid coal, liquefying normally solid oil shale, or liquefying normally solid-like tar sands. The hydrocarbonaceous liquid feed is contacted with at least one of the materials set forth hereinabove, the material being in a particulate form and preferably having a surface area of at least 1 square meter per gram, still more preferably at least 50 square meters per gram. The material can be employed by itself or in combination with a conventional support such as silica, alumina, magnesia, zirconia, thoria, zinc oxide, chromium oxide, naturally occurring supports such as clays, kieselguhr, Fuller's earth, pumice, bauxite, and the like, and combinations of two or more thereof whether naturally occurring or synthetically prepared.

"The material, whether supported or unsupported, can be in a particulate form to enhance intimate contacting of the material with the hydrocarbonaceous liquid to be treated. The particle size distribution is not critical although the greater the surface area the better from a point of view of completeness of contacting between the liquid and the material. Generally, the material can be in a form such that at least about 50 weight percent thereof has a largest cross-sectional dimension (i.e., the diameter of a particle if it is round or the longest dimension through the center of a particle if it is not round) of no longer than about ½ inch. The material can be in any physical form including powders, pellets, granules, spheres, flakes, cylinders, and the like. Any amount of the material can be employed on a support.

"Any amount of the material can be employed in the process of this invention, the more material that is present the better the removal of the impurity and the longer the material can be left in the process for treating new portions of liquid feed.

"As regards the oxides and sulfides of the metals set forth hereinabove, the ferric, nickelic, cobaltic, ferrous, nickelous, and cobaltous forms can be employed. For example, ferric oxides, both $Fe_2O_3$ and $Fe_3O_4$, nickelic oxides, $Ni_2O_3$ and $Ni_3O_4$, and cobaltic oxides, $Co_2O_3$ and $Co_3O_4$, can be employed. Similar reasoning is applicable to the comparable sulfides of the metals and to the ferrous, cobaltous, and nickelous forms of the oxides and sulfides.

"The liquid to be treated is mixed with the material, such as in a fixed bed reactor, at a temperature of at least 300° F., preferably at least 700° F., still more preferably from about 700° to about 850° F., under a reducing atmosphere, and for a time sufficient to achieve the desired degree of removal of impurity, generally at least about 1 minute. The reducing atmosphere is preferably provided by molecular hydrogen being present with the liquid as the liquid contacts the subdivided material. Preferably, there is a hydrogen partial pressure present of at least 500 psig, preferably at least 1500 psig."

Briefly summarized, the solid particulate material may comprise, for example, oxides or sulfides of iron, cobalt and nickel; alone or in combination with a supporting matrix, such as alumina. The solid particulate material may be employed in a plurality of processes or ways; for example, in a guard chamber to remove the arsenic from the fluid stream. Consequently, it is referred to herein, as a synonym and in shorthand nomenclature as "guard chamber material". After a sufficient amount of arsenic has been adsorbed, or removed from the stream, the material may contain 20-30 weight percent of the contaminant, such as arsenic, and is referred to as "spent". Disposal of the spent guard chamber material containing the poisonous contaminant presents a problem.

The literature suggests that roasting arsenic bearing ores in air will remove arsenic from the ores. Experience indicates, however, that only 40-60 percent, of the arsenic as measured by arsenic change in the guard bed material before and after roasting, is removed by roasting in air at temperatures below 2000° F.

The prior art has not provided a totally satisfactory solution for disposing of the spent guard chamber material or of removing the contaminant, such as arsenic, therefrom such that both the arsenic and the spent guard chamber material can be employed in commercially useful processes. For example, the separated contaminant can be oxidized and disposed of as an article of commerce, or salable product. As is well known, the compounds of arsenic, as well as arsenic itself, have several commercially useful forms. For example, the arsenic may be employed with material, such as aluminum, gallium and indium to form III-V semi-conductor compounds. Such semi-conductor compounds are employed in forming terminal diodes, varactor diodes, transistors, solar cells, experimental lasers, and Hall-effect and infra-red devices. The largest market, however, is for the compounds or arsenic, such as the arsenates that are employed in agriculture for various insecticides, biocides and the like. Arsenic acid is being used increasingly as a defoliant for cotton. Also, arsanilic acid is used as a feed supplement for poultry and the like. The preparation of these compounds is described in *Kirk-Othmer Encyclopedia of Chemical Technology*, Second Edition, Anthony Standen Editor, Interscience Publishers, New York, New York, 1963, Vol. 2, pages 711-731; and that descriptive matter is embodied herein by reference for supplying the details of the steps of preparation of the respective element and compounds from arsenic, arsenic sulfide, arsenic trioxide and similar arsenic compounds such as may be produced in the method of this invention.

Similarly, the separated guard chamber material, sans the contaminant, can be recycled for subsequent use as active guard chamber material or can be disposed of as any other inert material if desired. Ordinarily, of course, it will be advantageous to regenerate and reuse the spent guard chamber material as will be described hereinafter.

SUMMARY OF THE INVENTION

Accordingly, it is an object of this invention to provide a method of removing a contaminant from spent contaminant-removing material and converting the contaminant to a commercially useful form, thereby obviating the disadvantages of the prior art.

It is a specific object of this invention to provide a method of removing arsenic from spent contaminant-removing material; converting the arsenic to a commercially useful product; and preparing the contaminant-removing material for reuse; all while alleviating the difficulties of the prior art.

These and other objects will become apparent from the descriptive matter hereinafter.

The foregoing objects are accomplished in accordance with this invention by a method of removing a contaminant, such as selenium or arsenic, from spent particulate contaminant-removing, or guard chamber, material by a multi-step process as follows.

1. A sulfur-containing material is added to and admixed in intimate contact with the spent guard chamber material in a non-oxidizing atmosphere.

2. The sulfur-containing material and the spent guard chamber material are heated in a substantial absence of oxygen to a temperature sufficient to react the sulfur in the sulfur-containing material with the contaminant to form the sulfides of the contaminant.

3. The sulfides of the contaminant are separated from the guard chamber material and reacted with an oxygen-containing material to form a salable compound of the contaminant.

In a specific embodiment, the contaminant is arsenic and the temperature in step 3. is high enough to sublime, or convert to gaseous form, the arsenic sulfides, such as arsenic di- and tri-sulfides, to separate them from the guard chamber material before oxidation. The arsenic sulfides can then be oxidized to the arsenic oxides, primarily arsenic trioxide, $As_2O_3$ (or $As_4O_6$, as the case may be) if this is the required product. If desired, the arsenic trioxide may be reacted with nitric acid or other oxidizing agent to form arsenic acid.

The method of this invention may be carried out by a wide variety of apparatuses and process steps; such as, (1) concurrent flow of particulate sulfur-containing material and spent guard chamber material along a rotary kiln with an inert atmosphere being provided in the kiln; and (2) countercurrent or concurrent movement of a fluid sulfur-containing material, such as a liquid or a gas, past the particulate spent guard chamber material, itself being either in a fixed or moving bed in a column. Ordinarily, it may be most advantageous to flow a gaseous sulfur-containing material, with or without an added inert gas, through a column containing a bed of the spent guard chamber material. The bed of spent guard chamber material may itself be a moving bed, or a static bed.

DESCRIPTION OF PREFERRED EMBODIMENTS

According to the method of this invention, the spent guard chamber material is taken out of service in intimate contact with the hydrocarbonaceous fluid feed that was being treated for removal of the contaminant, such as arsenic or selenium. The hydrocarbonaceous fluid feed is also described in the aforementioned and incorporated by reference co-pending application Ser. No. 314,015.

The spent guard chamber material is introduced into a nonoxidizing atmosphere. By nonoxidizing atmosphere, or fluid, is meant the substantial absence of molecular oxygen. Expressed otherwise, the oxygen content is much less than 1 percent, preferably less than 0.1 percent; for example, less than 0.01 percent by volume of the atmosphere. The inert atmosphere may be provided by a separate fluid, such as helium or nitrogen or other of the well known inert gases. On the other hand, the inert atmosphere may be provided by the sulfur-containing material if it is a fluid.

The sulfur-containing material may comprise a solid or a fluid. For example, the sulfur-containing material may comprise solid material, such as pyrite ($FeS_2$), pyrrhotite (FeS), or free sulfur (S), as it is added to the spent guard chamber material. It will be appreciated, as the temperature is elevated that a solid such as sulfur will change form; for example, through a viscous liquid, a less viscous liquid, and finally a vapor; but these fluid forms facilitate more intimate contact and are satisfactory in dispersing throughout the matrix of the particular spent guard chamber material. The sulfur-containing material may also comprise a fluid such as vaporizable liquids as well as normally gaseous fluids. Illustrative of such fluids that can be employed as the source of sulfur are carbon disulfide, the mercaptans such as methyl-and ethyl-mercaptan, and the thiocyanates, and hydrogen sulfide. It has been found particularly advantageous to employ either the solids like pyrite or sulfur that can be employed in a rotary kiln or the like; or the gaseous sulfur-containing materials like hydrogen sulfide, alone or admixed with an inert gas like helium or nitrogen, because of the advantageous flow through a bed of the spent guard chamber material.

A quantity of sulfur-containing material is employed that is sufficient to effect removal of the arsenic. Expressed otherwise, at least a stoichiometric equivalent, based on the mols of sulfur available, is employed. There does not appear to be any advantage in employing more than about 300 percent of stoichiometric. When employing gases, the flow can be controlled based on effluent analyses, if desired; continuing flow as long as the arsenides occur at suitable concentrations in the effluent fluids.

The sublimed reaction products from interacting the sulfur-containing material and the spent guard chamber material containing; for example, arsenic, may be elementary arsenic, arsenic disulfide (AsS or $As_2S_2$), arsenic trisulfide and sulfur. Ordinarily, arsenic disulfide will be the predominant product, or arsenic sulfide, of interest.

The temperature to which the sulfur-containing material and the spent guard chamber material are heated may vary from a temperature that is barely high enough to effect interaction between the sulfur in the sulfur-containing material and the contaminant in the spent guard chamber material. This temperature may be as low as 650° F or lower. As indicated hereinbefore, the temperature is preferably high enough to sublime the sulfides of the contaminant; for example, arsenic sulfide (AsS). Thus, a temperature as high as about 1,500° F may be employed to ensure that all of the arsenic sulfides have been sublimed or vaporized. On the other hand, the sulfides of the contaminant, such as arsenic sulfide, can be eluted through a column of spent guard chamber material at the temperature as low as 650° F when the fluid sulfur-containing material is employed.

In the preferred embodiment in which the sulfides of the contaminant are separated in gaseous form, they are either oxidized directly or are condensed in a separate chamber. For example, the arsenic sulfide may be condensed at temperatures below about 600° F. If desired, the heated sulfides of the contaminant may be oxidized with an oxygen-containing material, such as air, while at their elevated temperature and the resulting oxides of the contaminant, such as arsenic trioxide, condensed. For example, arsenic trioxide will condense at temperatures below about 130° C (275° F). If desired, the oxides can be further treated to obtain the desired commercial product. For example, as described hereinbefore, arsenic trioxide may be reacted with nitric acid to form arsenic acid for use as a defoliant for cotton; or it may be reacted as described in the cited Kirk-Othmer reference to form the arsenates for agricultural uses or to form arsenilic acid for use as a feed additive.

In a particularly preferred embodiment of this invention, the spent guard chamber material will comprise iron oxide, $Fe_2O_3$, emplaced upstream of valuable catalyst beds employed to treat a feed stream; for example, to hydrogenate a synthetic crude. For purposes of illustration in this preferred embodiment, the contaminant will be referred to as arsenic, although it should be borne in mind that selenium may also be the contaminant. A predetermined amount of arsenic will have been interspersed through the particulate guard chamber material until the guard chamber material is "spent".

Thereafter, the synthetic crude stream will be routed through another bed of guard chamber material. The spent guard chamber material may be removed from its bed and treated as described hereinbefore. Preferably, however, the spent guard chamber material is treated in situ without the cost and labor of removing it from its guard chamber. The synthetic crude is drained from the guard chamber and replaced with a nonoxidizing atmosphere. Preferably, a stream of hot sulfur-containing gas, with or without an inert gas, is passed over the bed of spent guard chamber material to convert the arsenic sulfide and to elute and sublime the arsenic sulfide from the spent guard chamber material. The arsenic sulfide is condensed in a downstream condensation vessel held at a lower temperature. If desired, the effluent stream of hot fluid may be heat exchanged with an incoming stream of sulfur-containing gas. Supplemental heat may be added to the incoming supplemental gas by suitable heat exchangers, such as molten salt heaters, superheated steam exchangers, and direct fired heaters or the like. The condensed arsenic sulfide is then heated and burned, or reacted with oxygen at a temperature in the range of 500°–1,000° F, in accordance with conventional oxidizing processes. It may be desirable to oxidize the vaporized arsenic sulfide stream directly to avoid the expense of condensing and recovering arsenic sulfide.

After removal of the arsenic, the guard chamber material will ordinarily be in the sulfide form; for example, iron sulfide. Accordingly, it is ready to be employed again for removing the arsenic from the synthetic crude. If desired, it may be cooled to a proper temperature. The cooling may be effected by flowing therepast a suitable fluid; for example, flowing either the inert gas or the sulfur-containing gas or both through the bed to absorb the sensible heat of the bed and prevent having to supply that heat from another source. Past experience with solid adsorbents has indicated, however, that it is not absolutely necessary that the bed be cooled over a prolonged interval before the synthetic crude stream be again routed thereto. Frequently, any residual sensible heat of the bed can be advantageously taken up by the synthetic crude stream for use in subsequent processing operations.

If it is desired to convert the guard chamber material to iron oxide, a small amount of oxygen may be incorporated into a fluid passed through the guard bed to oxidize the iron or iron sulfide to the iron oxide.

The following examples illustrate by way of laboratory apparatus other embodiments of this invention. The spent guard chamber material was formerly an alumina supported or a nonsupported iron oxide catalyst. Analyses of the spent guard chamber material are by x-ray spectroscopy and may be subject to as much as 10 percent error because of changes in the iron matrix.

EXAMPLE I

This example is provided to illustrate the interaction between the sulfur is pyrite and the arsenic in the spent guard chamber material at elevated temperature.

Samples of about 3 grams of spent guard chamber material and about 3 grams of pyrite ($FeS_2$) were intimately admixed together, such as would be obtained if they traversed down an inclined rotary kiln. The resulting mixture was placed in an elongated pyrex reactor that was placed in a furnace, with a portion of the tube outside. An inert atmosphere of helium was employed and the two materials were heated to 1,200° F. The spent guard chamber material had substantially all of its arsenic removed therefrom and the arsenic converted to iron sulfide, probably in accordance with Equation (I).

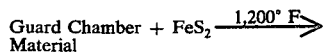

The arsenic sulfide (or disulfide) sublimed, passed off as a gas and separated from the guard chamber material; and collected as condensate in the cool portion of the reactor tube outside the furnace.

The reactor tube was then moved to place the condensed AsS in the furnace and burned in the presence of oxygen at a temperature in the range of 500°-1,000° F to form arsenic trioxide. The arsenic trioxide was collected by condensation on a cooler portion of the glass tube.

The spent guard chamber material originally had 14 percent by weight arsenic thereon. After the calcining with the pyrite, it had 0.028 percent by weight arsenic thereon. Thus, it can be seen that it was ready in the sulfide form or ready to be regenerated to the oxide form for subsequent use as a guard chamber material. One the other hand, if it were desired to be discarded, it was rendered harmless such that it could be discarded with no ill effects on the ecology, or environment.

From this example, iT can be seen that about 99.8 percent of the arsenic was removed from the spent guard chamber material.

EXAMPLE II

This example illustrates the use of particulate sulfur for removing the arsenic from the spent guard chamber material.

Samples of about 3 grams of spent guard chamber material and about 3 grams of sulfur were intimately admixed, such as would be effected in a rotary kiln. The resulting mixture was placed in the reactor tube and furnace, similarly as described in Example I. An inert atmosphere was also similarly provided by helium gas. The temperature was raised to 1,200° F. As noted hereinbefore, the sulfur undergoes changes of state during the process. The changes of state merely enhance the intimacy of the contact with the spent guard chamber material and facilitate reaction of the sulfur with the arsenic. The arsenic was removed from the spent guard chamber material probably in accordance with Equation (II).

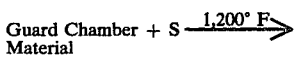 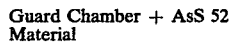     (II)

The arsenic sulfide sublimed and passed from the spent guard chamber material as a gas. The arsenic sulfide was condensed and then oxidized to arsenic trioxide, similarly as described in Example I.

Analysis of the guard chamber material before and after treating showed that it contained 14 percent by weight arsenic originally and contained only 0.08 percent by weight arsenic after the treatment.

EXAMPLE III

This example illustrates the efficacy of the gaseous sulfur-containing material.

A bed of about 3 grams of the spent guard chamber material was emplaced in the pyrex reactor tube and hydrogen sulfide flowed therepast. The temperature was controlled at 850° F. The hydrogen sulfide converted the arsenic to the arsenic disulfied which was sublimed and eluted from the guard chamber material; and was condensed and oxidized to arsenic trioxide downstream. The spent guard chamber material was restored to the iron sulfide state by the hydrogen sulfide at the elevated temperature. As indicated in Example I, the guard chamber material could be employed directly for removing arsenic from syncrude or could be regenerated to the iron oxide state.

The spent guard chamber material had 14 percent by weight arsenic thereon before treatment and had only about 0.03 percent by weight arsenic after treatment.

EXAMPLE IV

In this example, the efficacy of the gaseous sulfur-containing material at a lower temperature is illustrated. In this example, about 3 grams of spent guard chamber material were placed in a vessel and heated to only 700° F. A mixture of 5 percent hydrogen sulfide and 95 percent by volume helium was flowed through the column at 700° F. The arsenic sulfide was removed from the spent guard chamber material, probably in accordance with Equation (III).

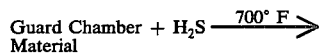     (III)

The arsenic sulfide was condensed and oxidized downstream. Analyses on the spent guard chamber material show that it contained about 14 percent by weight arsenic before treatment and contained only about 0.03 percent by weight arsenic after treatment.

Thus, the foregoing example illustrates that the gaseous sulfur-containing material is effective in removing the arsenic from the spent guard chamber material at temperatures as low as 700° F.

The arsenic sulfide from any of the foregoing examples was converted to arsenic trioxide by reaction with oxygen at temperatures in the range of 500°-1,000° F to $As_2O_3$. The $As_2O_3$ may be sold directly or may be converted to another useful form such as the elemental arsenic, arsenic acid or arsanillic acid in accordance with conventional technology such as delineated hereinbefore.

Conventional safety precautions should be employed in handling the arsenical products, particularly the arsenic trioxide. The latter can cause severe health hazards, such as penetration of the nasal septum, if such precautions are not observed. The dangers and precautions are well documented and the precautions have been employed satisfactorily for a long time in the arsenical products industry.

From the foregoing, it can be seen that this invention effects the objects delineated hereinbefore. More specifically, it provides a method of recovering arsenic in commercially useable form from a spent guard chamber material on which it was a contaminant, and a poisonous one at that. Moreover, the method decontaminates spent guard chamber material so it can be reused if desired or can be discarded, since it is harmless.

Having thus described the invention, it will be understood that such description has been given by way of illustration and example and not by way of limitation, reference for the latter purpose being had to the appended claims.

What is claimed is:

1. A method of regenerating for reuse a particulate contaminant-removing material that has been used to remove a contaminant selected from a group of selenium and arsenic from a synthetic hydrocarbonaceous liquid by effecting deposition of said contaminant within said contaminant-removing material such that said contaminant-removing material becomes spent; said particulate contaminant-removing material being selected from the class consisting of the oxides and sulfides of iron, cobalt and nickel, alone and on a supporting matrix; comprising the steps of:
  a. providing a non-oxidizing atmosphere about said spent contaminant-removing material; said non-oxidizing atmosphere containing less than 1 percent volume of oxygen;
  b. adding and admixing a sulfur-containing material in Intimate contact with said spent contaminant-removing material;
  c. heating said sulfur-containing material and said spent contaminant-removing material in a substantial absence of oxygen as provided by the non-oxidizing atmosphere to a temperature in the range of 700°–1500° F. and sufficient to react the sulfur in said sulfur-containing material with said contaminant to form the sulfides of the contaminant; and moving at least one of said sulfur-containing material and said contaminant-removing material with respect to and in intimate contact with the other at said temperature to react the sulfur in said sulfur-containing material with said contaminant to form the sulfides of said contaminant;
  d. converting said sulfides of said contaminant to gaseous form by heat and separating said gaseous sulfides of said contaminant from said contaminant-removing material such that said contaminant-removing material is ready for a reuse to again remove said contaminant from said synthetic hydrocarbonaceous liquid; and
  e. oxidizing said sulfides of said contaminant with an oxygen-containing material to form the oxides of said contaminant.

2. The method of claim 1 wherein said contaminant is arsenic and the sulfides of arsenic are separated from said contaminant-removing material by elevating said temperatures of step (c) high enough to convert to a gaseous state an effect gaseous removal of said sulfides of arsenic.

3. The method of claim 1 wherein said sulfur-containing material is a fluid and said fluid sulfur-containing material and said spent contaminant-removing material are passed counter currently with respect to each other to effect intimate admixing.

4. The method of claim 1 wherein said sulfur-containing material comprises a gas selected from the group consisting of sulfur and hydrogen sulfide and said gas is flowed past said spent contaminant-removing material at said elevated temperature.

5. The method of claim 4 wherein said sulfur-containing material comprises said gas and an inert gas.

6. The method of claim 5 wherein said sulfur-containing material comprises an admixture of hydrogen sulfide and an inert gas.

7. The method of claim 4 wherein said spent contaminant-removing material and said sulfur-containing material are both moved.

8. The method of claim 1 wherein said spent contaminant-removing material is moved with respect to said sulfur-containing material and in intimate contact therewith so as to effect conversion of said contaminant to said sulfides of said contaminant and said gaseous removal thereof.

9. The method of claim 1 wherein said sulfur-containing material comprises a particulate solid that is moved concurrently with said spent contaminant-removing material in the nonoxidizing atmosphere during said heating.

10. The method of claim 9 wherein said sulfur-containing material is selected from the class consisting of pyrite and sulfur.

* * * * *